Feb. 23, 1954

M. N. HOLMES 2,669,867

HOSIERY LENGTH MEASURING DEVICE

Filed Dec. 4, 1952

INVENTOR
MARK N. HOLMES

BY Cushman, Darby & Cushman
ATTORNEYS

Feb. 23, 1954

M. N. HOLMES 2,669,867

HOSIERY LENGTH MEASURING DEVICE

Filed Dec. 4, 1952

INVENTOR
MARK N. HOLMES
BY Cushman, Darby & Cushman
ATTORNEYS

Feb. 23, 1954 — M. N. HOLMES — 2,669,867
HOSIERY LENGTH MEASURING DEVICE
Filed Dec. 4, 1952 — 4 Sheets-Sheet 3

INVENTOR
MARK N. HOLMES
BY Cushman, Darby & Cushman
ATTORNEYS

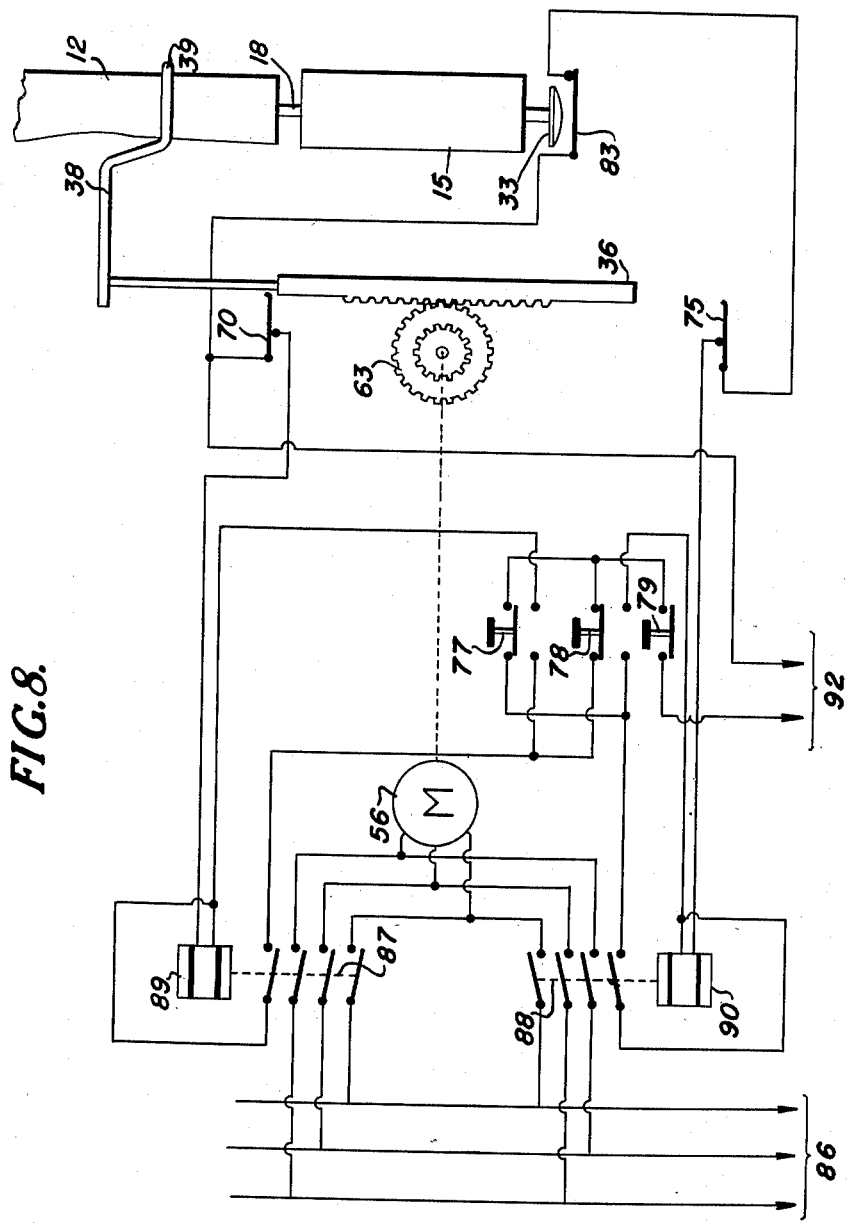

Patented Feb. 23, 1954

2,669,867

UNITED STATES PATENT OFFICE 2,669,867

HOSIERY LENGTH MEASURING DEVICE

Mark N. Holmes, Burlington, N. C., assignor to Burlington Mills Corporation, Greensboro, N. C., a corporation of Delaware Application December 4, 1952, Serial No. 324,061

9 Claims. (Cl. 73—89)

This invention relates to a hosiery length measuring device, and more particularly to a device for measuring the lengths of ladies' full-fashioned hose, although the device may be used for measuring the lengths of seamless hose and half hose.

In the ladies' hosiery industry, particularly nylon hosiery, it is difficult to produce hose of uniform lengths. This difficulty is due mainly to the resilient and plastic characteristics of nylon yarn which give rise to certain variable factors in the several manufacturing operations. Some of these variable factors that affect length of hose are static electricity, excessive tension, yarn creep, and yarn shrinkage. Knitting machines can be and are carefully adjusted to produce hosiery of proper and uniform lengths, but in spite of these careful adjustments, considerable variation in hosiery length occurs because of changes in the above factors. Hence, during manufacture, samples of finished knitted hose frequently are measured for length to make sure that such lengths are within prescribed limits. If the lengths vary from such limits, the knitting machines are readjusted to bring the lengths of subsequently knitted hose back within the prescribed tolerances.

Since unboarded nylon stockings are inherently stretchable, and do not readily resume their original dimensions upon being stretched out of shape, the sample measuring of hosiery lengths now is usually performed after the hose has been knit, looped, seamed, dyed, and finished (including boarding). It is obvious, however, that if only finished hosiery is measured for length, the manufacturing operation will have progressed a considerable extent past the point of length control, namely, the actual knitting operation wherein machine adjustments must be made to control hosiery length. Hence, a large number of hose of improper lengths will have been knitted before the knitting machines can be readjusted to knit proper lengths. It has now been found that if hosiery is measured for length after the looping and seaming operations, and while each stocking is under the same tension, the finished length of the hose can be predetermined after allowing a factor for shrinkage during the dyeing and finishing operations. In other words, the length of the hosiery can be measured and length variations noted in the foregoing manner even before the hose has been set to its final length by the boarding operations used in the finishing of nylon hose.

Furthermore, final hosiery length is subject to variation, not only by the actual knitting thereof, but also by the final boarding operation, because the stockings may be pulled too tightly over the boarding form by the operators and, therefore, set to an improper length. Hence it is desirable to provide a device for accurately and readily measuring the length of hosiery while subjected to the same tension immediately preceding and immediately following the final boarding operation, in order to determine whether the boarding operators are placing the stockings on the boarding forms with the same proper degree of tension.

In my co-pending application, Serial No. 291,173, filed June 2, 1952, I have disclosed and claimed a novel device for measuring the length of hosiery and for subjecting each stocking, prior to measurement, to the same predetermined longitudinal tension. In my prior invention, a stocking is positioned on a form and manually stretched until the form mounting exerts a predetermined force on force measuring means associated therewith, and then released. After allowance of a brief period of time for creep back, the length of the stretched stocking is measured in conjunction with indicia on the form.

While my prior invention operates quite satisfactorily, I have now devised improvements thereon which adapt it for large scale operation, by eliminating from its operation some manual steps, and particularly by eliminating the time interval involved in operation of the prior device.

Accordingly, a salient object of the present invention is to provide a device for measuring the length of hosiery, including power means for uniformly applying stretching force thereto, and means for automatically deactivating said power means when a predetermined stretching force is reached.

A related object of the present invention is to provide a hosiery length measuring device adapted to indicate hosiery length immediately upon maximum stretching force being attained.

Another object is to provide a device for measuring hosiery length with great speed, and excellent uniformity.

Other objects will be in part evident and in part pointed out hereinafter.

The invention and the novel features thereof may best be made clear from the following description and the accompanying drawings, in which:

Figure 2A is a fragmentary top plan view corresponding to Figure 2;

Figure 5 is an enlarged sectional view taken on the line 5—5 of Figure 4;

Figure 6 is an enlarged sectional view taken on the line 6—6 of Figure 1;

Figure 7 is an enlarged sectional view taken on the line 7—7 of Figure 1;

Figure 8 is a circuit diagram illustrating the operation of the device, and

Figure 1:
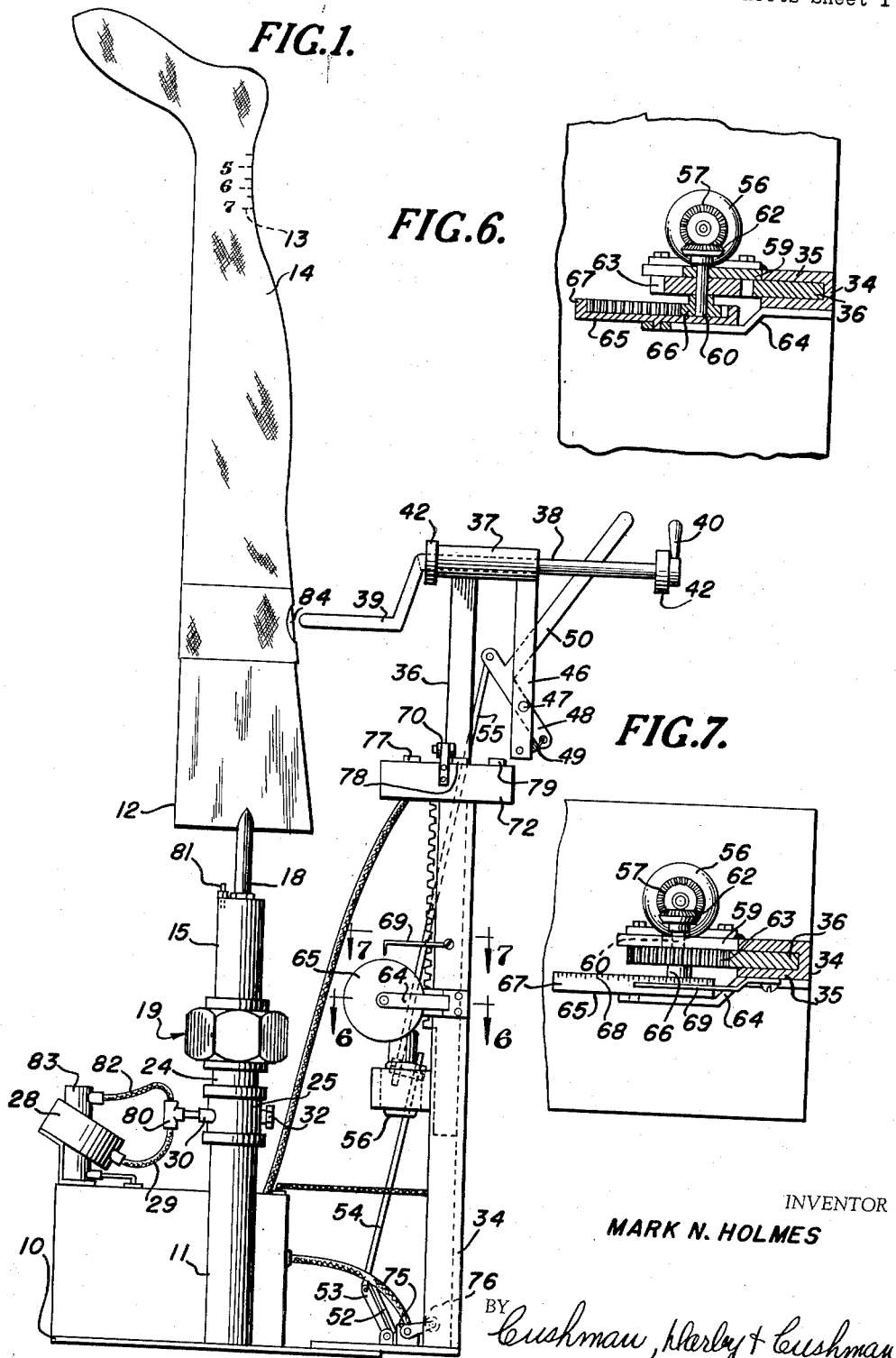
Figure 1 is a side elevational view of a preferred embodiment of the invention, showing a stocking positioned for measurement.

Referring to the drawings in detail, in Figures 1 to 4 is shown a frame 10, supporting thereabove a vertical pedestal 11. Directly above the pedestal is mounted a flat hosiery form 12, which may be a conventional boarding form. The heel area of form 12 is provided with heel length indicating indicia 13, and a stocking 14 is positioned on the form for length measurement.

Atop pedestal 11 is mounted a tubular member 15 having transverse partitions 16 at each end thereof, as shown in Figure 5. Partitions 16 are provided with axial apertures 17, suitably sized to slidably receive a rod 18 extending longitudinally and centrally from the welt end of form 12 to support the form foot upwards in the vertical position shown. Threadably secured to the lower end of member 15 is a pipe coupling indicated generally as 19, having a concavo-convex flexible diaphragm 20, of rubber or other suitable material, clamped between its coupling members 22 by the coupling ring 23. A short nipple 24 is threaded into the lower coupling member 22 and into the upper end of an interiorly threaded fitting 25 which is, in turn, threaded onto the upper closed end of pedestal 11.

An interior closed chamber 26 is thus formed by the flexible diaphragm 20, lower coupling member 22, nipple 24, fitting 25, and the closed upper end of pedestal 11. This chamber is filled with a relatively viscous liquid 27, such as glycerine or hydraulic brake fluid. A pressure gauge 28 is connected through line 29 to an apertured boss 30 on the side of fitting 25, and the fitting is also provided with a screw 32 threaded through a side wall thereof and projecting into chamber 26 for a purpose hereinafter described.

The lower end of rod 18 is provided with a transverse plate or disc 33 resting upon the convex upper surface of diaphragm 20. As will be evident, pressure variations in the fluid within chamber 26 effected by downward movement of rod 18 relative to diaphragm 20 will be indicated by the pressure gauge 28. The mechanism described above is substantially that disclosed and claimed in my pending former application, Serial No. 291,173.

The additional structure added to my prior invention to further improve its operation includes a standard 34, conveniently of U-shaped cross-sectional configuration, mounted vertically on frame 10 adjacent pedestal 11. Slidably mounted between side sections 35 of the standard 34 is a rack 36, which extends above the upper end of the standard and supports at its top a transverse slide housing 37. The slide housing, as shown, is horizontally disposed and axially aligned with form 12. Enclosed by the slide housing is a slide 38, formed at its end adjacent form 12 into an offset fork member 39 and provided at its opposite end with a handle 40.

Figure 2:
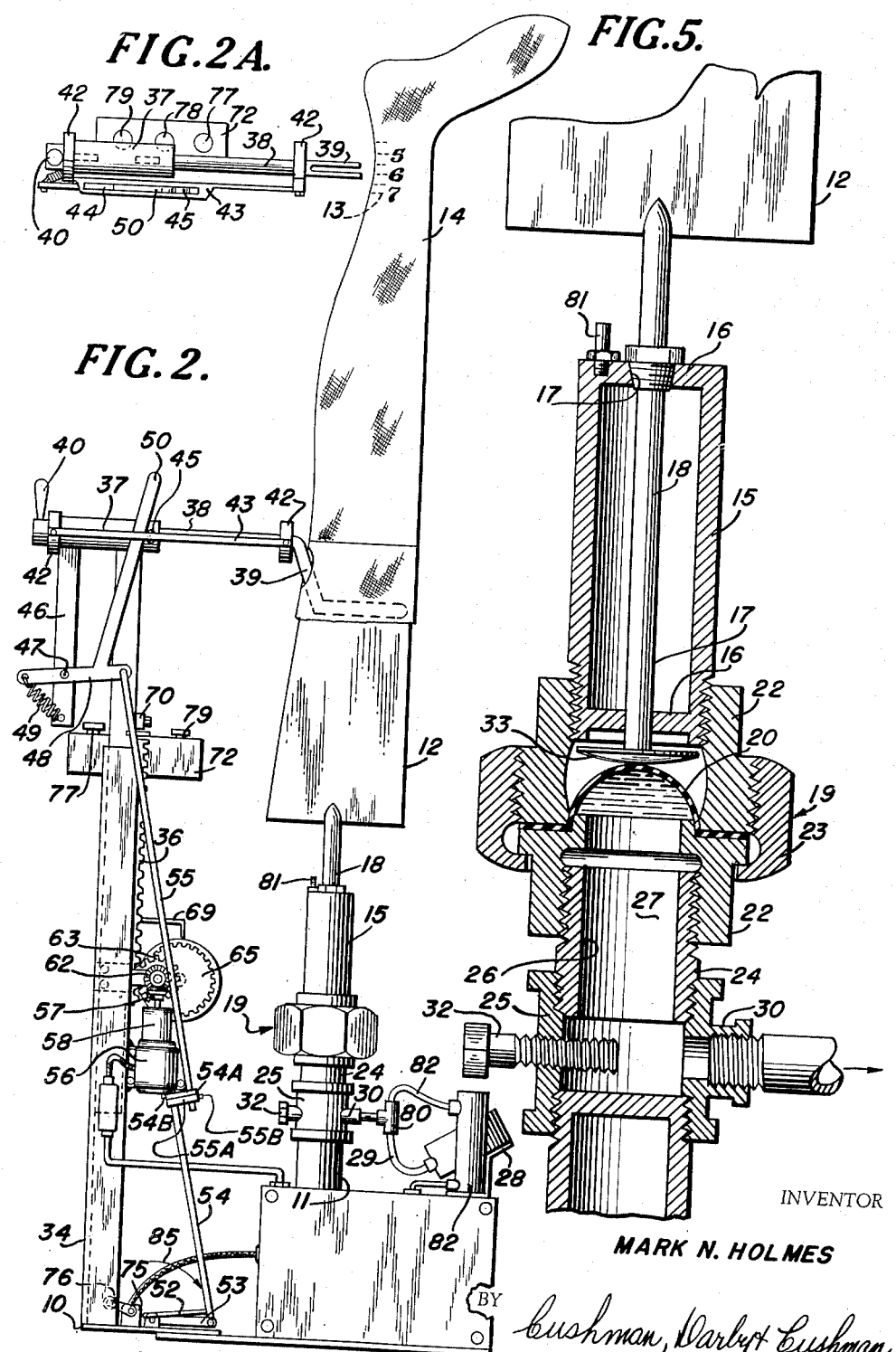
Figure 2 is a side elevational view opposite to that of Figure 1, showing the stocking engaged for stretching.
Figures 3, 4, 9:
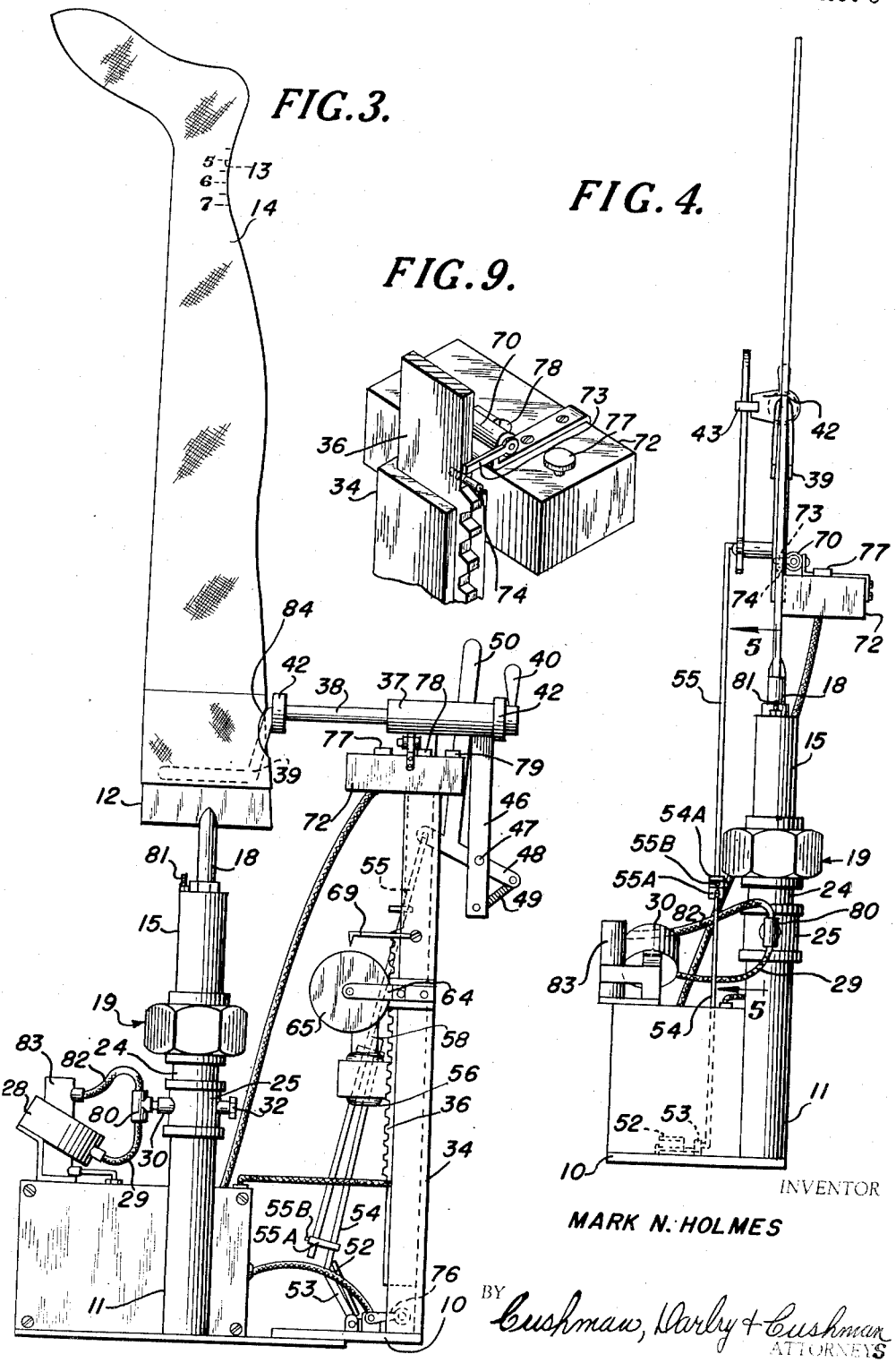
Figure 3 is a view corresponding to that of Figure 1, showing the stocking in stretched condition.
Figure 4 is an end elevational view of the device of Figure 1.
Figure 9 is an enlarged perspective detail view showing one of the limit mechanisms of the device.

To limit the movement of slide 38 within housing 37, two suitably spaced stop members 42 are fastened thereon. As best shown in Figures 2A and 4, the stops 42 are laterally extended and support between them a yoke 43, provided with a slot 44 and a roller 45 mounted within the slot. A bar 46 extends downwardly from slide housing 37, and pivotally mounted thereon at 47 is a link 48. One end of link 48 is biased toward the lower end of bar 46 by a spring 49. An arm 50 extends upwardly from link 48, the arm extending through and being slidably enclosed by slot 44 of the yoke 43.

A treadle 52 is pivotally mounted on frame 10 adjacent the foot of standard 34, and the arm 53 secured thereto is engaged to the free end of link 48 by a telescoping linkage including, in the exemplary embodiment, a rod 54 pivotally secured to the outer end of arm 53 and a rod 55 similarly affixed to the free end of link 48. To effect the desired telescoping relationship, rod 54 has a block 54A secured thereto adjacent its outer end, as by set screw 54B, and rod 55 is similarly provided with a block 55A and set screw 55B. Block 54A is apertured and slidably encloses rod 55, and block 55A similarly encloses and rides upon rod 54.

To drive rack 36 and the slide mechanism associated therewith, a reversible electric motor 56 suitably mounted on standard 34, adapted to drive a bevel gear 57 through reduction gearing 58. A support 59 extending from standard 34 (Figures 2 and 6) rotatably mounts a horizontally disposed stub-shaft 60, to one end of which is fastened a bevel gear 62 maintained in meshing engagement with the driving bevel gear 57. On the other side of support 59, a pinion 63 is fixed to stub shaft 60, the pinion being engaged in driving relationship to rack 36. Motor 56, then, is adapted to drive, through the bevel gears, stub shaft and pinion 63, the rack 36 in either vertical direction.

Indicating mechanism is also associated with the rack drive, to indicate the vertical rack position and the stocking length corresponding thereto. The indicating mechanism may include, simply, a bracket 64 extending outwardly from standard 34 at about the level of stub shaft 60, the bracket rotatably supporting adjacent its outer end a drum 65, which is internally geared and engaged to a small gear 66 fixed to the end of shaft 60, as best shown in Figure 6. The peripheral skirt portion 67 of drum 65 is provided with indicia 68, which may be read in conjunction with a stationary pointer 69, fastened to standard 34 and extending to a position immediately above the indicating drum. As will be evident, the indicia 68 are desirably spaced to correspond to units of hosiery length.

To limit the vertical movement of rack 36, upper and lower limit switches are provided. Conveniently, the upper limit switch 70 may be mounted on a control box 72 positioned at the top of standard 34, with its switch arm 73 extending adjacent the path of rack 36 for engagement by an actuating pin 74 mounted in the rack at suitable position, see Figure 9. The lower limit switch 75 may be mounted on frame 10, its switch arm 76 extending between the side sections 35 of standard 34, in position to be actuated by the lower end of rack 36. The control box 72 mounts a push button switch 77 to effect upward movement of the rack, a push button switch 78 to effect downward movement of the rack, and an emergency stop push button switch 79.

As a salient feature of the invention, means are provided to automatically deactivate driving motor 56 during the downward movement of rack 36 when a predetermined force has been transmitted to form 12 through the stocking thereon being measured. Conveniently, such means may be incorporated by inserting a T 80 in the pressure gauge line 29, and running a branch line 82 therefrom in communication with a conventional pressure actuated switch 83, suitably incorporated in the power circuit of motor 56. To limit the downward movement of form 12 relative to tubular member 15, and thereby prevent possible damage to diaphragm 20, an adjustable stop member 81 may be threaded into the upper partition 16 of member 15, positioned directly below the welt end of form 12.

Operation of the device will now be described in detail. A stocking 14 to be measured for length is manually positioned on form 12, assuming the position shown in Figure 1. The operator may then spread the seamer opening 34 of the stocking welt, using both hands, and depression of foot treadle 52 will cause the fork member 39 of slide 38 to enter the seamer opening and engage the stocking welt, as shown in Figure 2. As will be evident, the prongs of fork 39 engage the stocking on opposite sides of the form, and the offset configuration thereof effects engagement of the welt at the outer edge thereof for a considerable distance, so that the stocking is firmly and evenly engaged. With the slide mechanism in up position, movement of the treadle in the direction of arrow 85, Figure 2, will cause engagement of blocks 54A and 55A, and thereafter through rods 54 and 55 will pivotally displace link 48 about its pivot 47, against the action of spring 49. This pivotal movement will cause link arm 50 to move within yoke slot 44 to engage roller 45, and thereafter displace the slide and yoke assembly toward the form, to the final position shown in Figures 2 and 2A.

Having assisted entry of fork 39 into the stocking welt through the seamer opening, the operator may release the stocking and immediately close push button switch 78, energizing motor 56 in proper direction to move rack 36 and the associated slide assembly downwardly relative to the form. The rack being driven downwardly at uniform rate will apply constantly increasing stretching force to the stocking 14, which force will be transmitted by the stocking to form 12 and thereby to the flexible diaphragm 20 and the hydraulic chamber 26 of which it is a part. Pressure switch 83 having been previously adjusted to operate at a desired pressure, when a stretching force of predetermined magnitude has been exerted on stocking 14, the resultant pressure in chamber 26 will effect actuation of switch 83, which will thereupon operate to deactivate motor 56. At this point the indicated length of the stocking may immediately be read by means of the indicia 68 on the skirt portion 67 of drum 65. The heel length of the stocking may also be read at the same time by means of the heel indicia 13 on the hosiery form, visible through the stocking. The final down position of the device is illustrated in Figure 3.

It will be noted that treadle 52 need not be maintained down after initial positioning of fork 39 within the stocking welt. Spring 49 will return link 48 to such position that its arm 50 is out of contact with roller 45, but has insufficient strength to displace the slide and yoke mechanism to remove the fork from the stocking welt. In the downward movement of the rack and slide, the telescoping connection between rods 54 and 55 will absorb the movement of link 48 relative to the treadle. The length measurements of the stocking having been noted, the rack may be returned to up position by closing push button switch 77, whereupon motor 56 will be energized to drive the rack upwardly until pin 74 actuates the arm 73 of limit switch 70, to break the motor circuit.

In the event the rack is actuated downwardly with no stocking on the form, or if the stocking being tested should break, the bottom end of the rack will engage switch arm 76 of the limit switch 75, and thereby break the motor circuit before the device is damaged. Emergency stop push button switch 79 is effective to stop the movement of the rack in either direction at any time, should such become necessary or desirable.

The screw 32 may be adjusted in or out to vary the volume of chamber 26, and constitutes a convenient adjustment for calibrating and zeroing pressure gauge 28. The pressure gauge is convenient for setting pressure switch 83 to operate at desired pressure, and for checking its action through continued operations.

An electrical system suitable for effecting the functions described above is illustrated in Figure 8 of the drawings, wherein motor 56 is reversibly connected to a three-phase power line 86, through gang switches 87 and 88 operated by relays 89 and 90, respectively. The relays are powered by connection to a two-conductor power line 92. To drive rack 36 downwardly push button switch 78 is closed completing a circuit from power line 92 through closed stop switch 79, open up switch 77, closed down switch 78, down relay 90, closed down limit switch 75 and closed pressure switch 83. Actuation of relay 90 closes gang switch 88, energizing motor 56 in proper direction to drive the rack down. Closing of gang switch 88 also completes a holding circuit excluding down switch 78, through closed stop switch 79, open up switch 77, closed gang switch 88, down relay 90, closed down limit switch 75 and closed pressure switch 83, so that the down push button switch 78 may be released immediately after a momentary closing. Thereupon the rack will be driven downwardly at uniform speed until the circuit is interrupted by opening of either pressure switch 83 or down limit switch 75, or of course by the opening of stop switch 79.

When the downward movement of the rack has stopped, it may be returned to up position by momentarily closing push button switch 77, thereby completing a circuit from power source 92 through closed stop switch 79, open down switch 78, closed up switch 77, up relay 89 and the closed upper limit switch 70. Actuation of relay 89 closes gang switch 87, thereby energizing motor 56 in a direction to drive the rack upwardly, and also completing a holding circuit through the relay which excludes up switch 77. Motor 56 will thereupon drive the rack upwardly until this power circuit is interrupted by opening of upper limit switch 70, or in special case by the opening of stop switch 79.

It will thus be seen that the objects of this invention have been fully and effectively accomplished. It will be realized, however, that the specific embodiment illustrated and described for the purpose of disclosing this invention is susceptible to various changes without departing from such principles. Therefore, this invention embraces all modifications encompassed by the spirit and scope of the following claims.

I claim:

1. A hosiery length measuring device comprising a yieldably mounted hosiery form, power means for applying stretching force to a stocking positioned on said form, means responsive to movement of said form for automatically deactivating said power means when a predetermined force has been applied, and means responsive to operation of said power means for indicating the length of said stocking in stretched condition.

2. A hosiery length measuring device comprising a yieldably mounted hosiery form, fork means for engaging the welt of a stocking positioned on said form, power means for moving said fork longitudinally relative to said form to stretch said stocking, means responsive to movement of said form for automatically deactivating said power means when a predetermined force has been transmitted to said form through said stocking, and means responsive to movement of said fork means for indicating the length of said stocking in stretched condition.

3. A hosiery length measuring device comprising a hosiery form, a support rod attached to the welt end of said form, a bearing movably supporting said rod between the ends thereof, means defining a closed fluid-filled chamber, a flexible diaphragm forming a wall of said chamber and disposed in adjacency to the free end of said support rod, power means for applying stretching force to a stocking positioned on said form, said rod pressing on said diaphragm when force is applied to said stocking, and means in communication with said chamber operative on attainment of a predetermined pressure therein to deactivate said power means.

4. A hosiery length measuring device comprising a hosiery form, a support rod attached to the welt end of said form, a bearing movably supporting said rod between the ends thereof, means defining a closed fluid-filled chamber, a flexible diaphragm forming a wall of said chamber and disposed in adjacency to the free end of said support rod, an electric motor and means driven thereby for applying stretching force to a stocking positioned on said form, said rod pressing on said diaphragm when force is applied to said stocking, indicating means driven by said motor for indicating the length of said stocking in stretched condition, and a pressure switch in communication with said chamber and operative on attainment of a predetermined pressure therein to deactivate said electric motor.

5. A measuring device as defined in claim 4, including a pressure indicating gauge in communication with said chamber.

6. A hosiery length measuring device comprising a frame, a hosiery form, means for movably supporting said form by its welt end above said frame, a rack member slidably mounted above said frame for movement in a path parallel to the longitudinal axis of said form, a fork member slidably mounted on the upper end of said rack member for lateral movement relative to said form and adapted to engage the welt of a stocking positioned on said form, an electric motor for driving said rack member in said path, hydraulic means responsive to movement of said form support means and adapted to deactivate said electric motor when a predetermined force is transmitted to said form through said stocking, and indicating means responsive to movement of said rack member for indicating the length of said stocking in stretched condition.

7. A measuring device as defined in claim 6, including limit switches disposed adjacent the path of said rack member, said switches being operatively connected to said motor to deactivate said motor when said rack member reaches either end of its travel.

8. A measuring device as defined in claim 6, including a treadle pivotally mounted on said frame, and a telescoping linkage extending between said treadle and said fork member whereby said fork member may be laterally displaced by said treadle when the rack member is at the upper end of its travel.

9. A hosiery length measuring device comprising a frame, a hosiery form, a support rod attached to the welt end of said form, a bearing mounted above said frame movably supporting said rod between the ends thereof, means defining a closed fluid-filled chamber below said bearing, a flexible diaphragm forming the upper wall of said chamber and disposed in adjacency to the free end of said support rod, a rack member slidably mounted above said frame for movement in a path parallel to the longitudinal axis of said form, a fork member slidably mounted on the upper end of said rack member for lateral movement relative to said form and adapted to engage the welt of a stocking positioned on said form, an electric motor for driving said rack member in said path, said rod pressing on said diaphragm when said fork member is moved while engaged in the welt of a stocking, a pressure switch in communication with said chamber and operative on attainment of a predetermined pressure therein to deactivate said electric motor, and indicating means responsive to movement of said rack member for indicating the length of said stocking in stretched condition.

MARK N. HOLMES.

References Cited in the file of this patent

UNITED STATES PATENTS

| Number | Name | Date |
|--------|------|------|
| 922,524 | Schopper | May 25, 1909 |
| 2,066,311 | Appel et al. | Jan. 5, 1937 |
| 2,369,661 | Dangelmajer | Feb. 20, 1945 |